(12) United States Patent
Arai et al.

(10) Patent No.: US 11,487,004 B2
(45) Date of Patent: Nov. 1, 2022

(54) ULTRASONIC WAVE MEASURING DEVICE AND ULTRASONIC WAVE MEASURING METHOD

(71) Applicant: Seiko Epson Corporation, Tokyo (JP)

(72) Inventors: Yoshio Arai, Shiojiri (JP); Tomohide Onogi, Shiojiri (JP)

(73) Assignee: SEIKO EPSON CORPORATION

( * ) Notice: Subject to any disclaimer, the term of this patent is extended or adjusted under 35 U.S.C. 154(b) by 149 days.

(21) Appl. No.: 16/799,913

(22) Filed: Feb. 25, 2020

(65) Prior Publication Data

US 2020/0271779 A1    Aug. 27, 2020

(30) Foreign Application Priority Data

Feb. 26, 2019    (JP) .............................. JP2019-032519

(51) Int. Cl.
   *G01S 15/10* (2006.01)
   *G01S 7/526* (2006.01)
(52) U.S. Cl.
   CPC ............ *G01S 15/101* (2013.01); *G01S 7/526* (2013.01)
(58) Field of Classification Search
   None
   See application file for complete search history.

(56) References Cited

U.S. PATENT DOCUMENTS

| | | | | |
|---|---|---|---|---|
| 4,787,252 A * | 11/1988 | Jacobson | .................. | G01F 1/66 73/861.28 |
| 8,903,663 B2 * | 12/2014 | Shiba | ..................... | G01F 1/662 702/48 |
| 10,591,330 B2 * | 3/2020 | Shiota | ...................... | H03K 5/24 |
| 2007/0186680 A1 * | 8/2007 | Lang | ......................... | G01F 1/66 73/861.27 |
| 2008/0190213 A1 * | 8/2008 | Lang | ....................... | G01P 5/245 73/861.28 |
| 2011/0238332 A1 * | 9/2011 | Shiba | ..................... | G01F 1/667 702/48 |

(Continued)

FOREIGN PATENT DOCUMENTS

JP    H05-034192 A        2/1993
JP    2005009893 A   *    1/2005

*Primary Examiner* — Isam A Alsomiri
*Assistant Examiner* — Vikas Atmakuri
(74) *Attorney, Agent, or Firm* — Harness, Dickey & Pierce, P.L.C.

(57) ABSTRACT

An ultrasonic wave measuring device including an ultrasonic wave device and a processor. The ultrasonic wave device transmits transmission ultrasonic waves toward an object, receives reflected ultrasonic waves, and outputs reception signals. The processor is configured to: detect a transmission time; detect zero-crossing points of the reception signals; detect zero-crossing times; calculate periods of time between the transmission time and each of the zero-crossing times; compare a reference period of time with each of the calculated periods of time so as to generate difference values therebetween; determine a minimum value among the difference values; and set a corresponding zero-crossing point having the minimum value as a reception zero-crossing point. The ultrasonic wave measuring device is configured to measure a distance toward the object based on the period of time between the zero-crossing time corresponding to the reception zero-crossing point and the transmission time.

2 Claims, 7 Drawing Sheets

(56) References Cited

U.S. PATENT DOCUMENTS

| | | | | |
|---|---|---|---|---|
| 2013/0051818 A1* | 2/2013 | Mori | ............... | G01N 29/38 |
| | | | | 399/16 |
| 2015/0114078 A1* | 4/2015 | Shiba | ............... | G01F 1/667 |
| | | | | 73/1.16 |
| 2015/0292926 A1* | 10/2015 | Takemura | ............ | G01F 15/024 |
| | | | | 73/861.03 |
| 2016/0120513 A1* | 5/2016 | Aragaki | ............ | G01S 15/8963 |
| | | | | 600/443 |
| 2016/0124088 A1* | 5/2016 | Masuda | ............ | G01S 7/52046 |
| | | | | 367/7 |

* cited by examiner

ULTRASONIC WAVE MEASURING DEVICE AND ULTRASONIC WAVE MEASURING METHOD

The present application is based on, and claims priority from, JP Application Serial Number 2019-032519, filed Feb. 26, 2019, the disclosure of which is hereby incorporated by reference herein in its entirety.

BACKGROUND

1. Technical Field

The present disclosure relates to an ultrasonic wave measuring device and an ultrasonic wave measuring method.

2. Related Art

In related art, there has been an ultrasonic wave measuring device that performs ultrasonic wave transmission and reception processing on an object and measures a distance to the object based on a time from a transmission timing of the ultrasonic waves to a reception timing of the ultrasonic waves (for example, refer to JP-A-5-34192).

In the ultrasonic wave measuring device, the reception timing is specified based on zero-crossings of reception signals that exceed a threshold among waveform data of the reception signals when ultrasonic waves are received. However, as the distance from the ultrasonic wave measuring device to the object increases, a sound pressure of the ultrasonic waves received by an ultrasonic wave reception unit decreases, so that numbers and positions of the reception signals that exceed the threshold value also change. In this case, the zero-crossing set as the reception timing of the ultrasonic waves may change in each time of measurement, so that an offset error may occur.

With respect to this, an ultrasonic wave measuring device described in JP-A-5-34192 performs ultrasonic wave processing for a plurality of times and obtains waveform data corresponding to each time. Then, the ultrasonic wave measuring device sets a temporary reference zero-crossing for waveform data of ultrasonic wave processing performed for a first time, and sets a reference zero-crossing for waveform data of ultrasonic wave processing of an i-th time based on a reference zero-crossing of waveform data of an i-1th time. Then, the ultrasonic wave measuring device obtains an amplitude of a j-th (j=0, 1, 2, . . . J) wave of each time and calculates an average amplitude $S_j$ thereof. Then, the ultrasonic wave measuring device sets a zero-crossing two waves after a zero-crossing of a wave whose amplitude ratio Rj of a j-th average amplitude $S_j$ to a j+1-th average amplitude $S_{j+1}$ reached a maximum value as the reception timing, and calculates the distance from the ultrasonic wave measuring device to the object.

However, the ultrasonic wave measuring device described in JP-A-5-34192 requires a high-resolution A/D converter which can detect a peak value and a bottom value of each wave of the waveform data. In addition, the waveform data obtained by the high-resolution A/D converter has a large data capacity, and it is necessary to store the waveform data obtained from a plurality of times of ultrasonic wave processing in a storage unit, so that a large-capacity storage area is required. For this reason, there is a problem that cost of the ultrasonic wave measuring device is high and the processing time of the ultrasonic wave measuring device is long.

SUMMARY

An ultrasonic wave measuring device according to a first application example includes: an ultrasonic wave transmission and reception unit configured to perform ultrasonic wave transmission and reception processing of transmitting ultrasonic waves to an object and receiving the ultrasonic waves reflected by the object, and to output reception signals based on reception of the ultrasonic waves; a zero-crossing detection unit configured to detect a plurality of zero-crossings corresponding to the reception signals whose signal voltages are equal to or higher than a predetermined threshold; and a reception setting unit configured to set a reception zero-crossing used as a reception timing of the ultrasonic waves based on the plurality of zero-crossings. The reception setting unit is configured to calculate a difference between a zero-crossing detection time from a transmission timing of the ultrasonic waves to a time at which the zero-crossing is detected and a predetermined reference time for each of the plurality of the zero-crossings, and to set one of the zero-crossings at which the difference is minimum among the plurality of zero-crossings as the reception zero-crossing.

In the ultrasonic wave measuring device of the first application example, the reception setting unit may be configured to use the zero-crossing detection time from the transmission timing of the ultrasonic wave transmission and reception processing performed at an i-th time to the reception zero-crossing set based on the ultrasonic wave transmission and reception processing performed at the i-th time as the reference time when the reception zero-crossing is set based on the ultrasonic wave transmission and reception processing performed at an i+1-th time.

An ultrasonic wave measuring device according to a second application example includes: an ultrasonic wave transmission and reception unit configured to perform ultrasonic wave transmission and reception processing of transmitting ultrasonic waves to an object and receiving the ultrasonic waves reflected by the object, and to output reception signals based on reception of the ultrasonic waves; a zero-crossing detection unit configured to detect a plurality of zero-crossings corresponding to the reception signals whose signal voltages are equal to or higher than a predetermined threshold; and a reception setting unit configured to set a reception zero-crossing used as a reception timing of the ultrasonic waves based on the plurality of zero-crossings. The reception setting unit is configured to set one of the plurality of zero-crossings that is n/2-th detected as the reception zero-crossing, where n represents a detection number of the plurality of zero-crossings, and where if n/2 is not an integer, n/2 is rounded up to a nearest integer.

An ultrasonic wave measuring method according to a third application example is a method performed by an ultrasonic wave measuring device including: an ultrasonic wave transmission and reception unit configured to perform ultrasonic wave transmission and reception processing of transmitting ultrasonic waves to an object and receiving the ultrasonic waves reflected by the object, and to output reception signals based on reception of the ultrasonic waves; and a zero-crossing detection unit configured to detect a plurality of zero-crossings corresponding to the reception signals whose signal voltages are equal to or higher than a predetermined threshold. The ultrasonic wave measuring method includes: calculating a difference between a zero-crossing detection time from a transmission timing of the ultrasonic waves to a time at which the zero-crossing is detected and a predetermined reference time for each of the plurality of the zero-crossings; and setting one of the zero-crossings at which the difference is minimum among the plurality of zero-crossings as a reception zero-crossing used as a reception timing of the ultrasonic waves.

An ultrasonic wave measuring method according to a fourth application example is a method performed by an ultrasonic wave measuring device including: an ultrasonic wave transmission and reception unit configured to perform ultrasonic wave transmission and reception processing of transmitting ultrasonic waves to an object and receiving the ultrasonic waves reflected by the object, and to output reception signals based on reception of the ultrasonic wave; and a zero-crossing detection unit configured to detect a plurality of zero-crossings corresponding to the reception signals whose signal voltages are equal to or higher than a predetermined threshold. The method includes: setting one of the plurality of zero-crossings that is n/2-th detected as a reception zero-crossing used as a reception timing of the ultrasonic waves, where n represents a detection number of the plurality of zero-crossings, and where if n/2 is not an integer, n/2 is rounded up to a nearest integer.

DESCRIPTION OF EXEMPLARY EMBODIMENTS

First Embodiment

Hereinafter, an ultrasonic wave measuring device of a first embodiment will be described.

Figure 1:
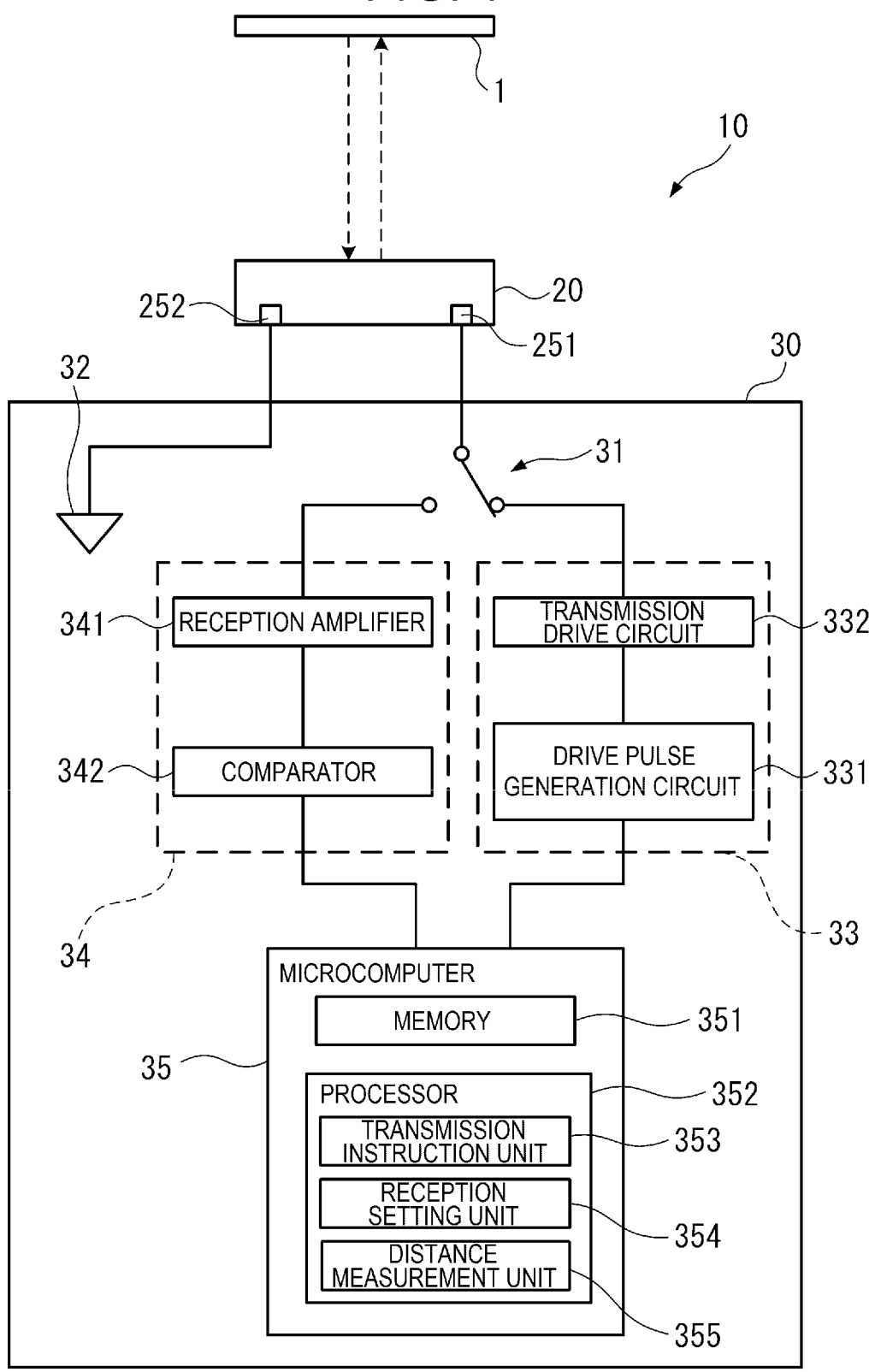
FIG. 1 is a schematic diagram showing a schematic configuration of an ultrasonic wave measuring device according to a first embodiment.

FIG. 1 is a schematic diagram showing a schematic configuration of an ultrasonic wave measuring device 10 according to the first embodiment.

The ultrasonic wave measuring device 10 includes an ultrasonic wave device 20, and a control circuit 30 that controls the ultrasonic wave device 20. The ultrasonic wave measuring device 10 performs ultrasonic wave transmission and reception processing of transmitting ultrasonic waves from the ultrasonic wave device 20 to an object 1 under the control of the control circuit 30, and receiving the ultrasonic waves reflected by the object 1 with the ultrasonic wave device 20. Then, the control circuit 30 calculates a distance from the ultrasonic wave device 20 to the object 1 based on a time from a transmission timing of the ultrasonic waves of the ultrasonic wave transmission and reception processing performed by the ultrasonic wave device 20 to a reception timing of the ultrasonic waves reflected by the object 1.

Here, the ultrasonic wave measuring device 10 according to the first embodiment is a device that measures the distance from the ultrasonic wave device 20 to the object 1 on the premise that a change in relative positions of the object 1 and the ultrasonic wave device 20 is minute.

Hereinafter, details of each configuration of the ultrasonic wave measuring device 10 will be described.

Configuration of Ultrasonic Device 20

Figure 2:
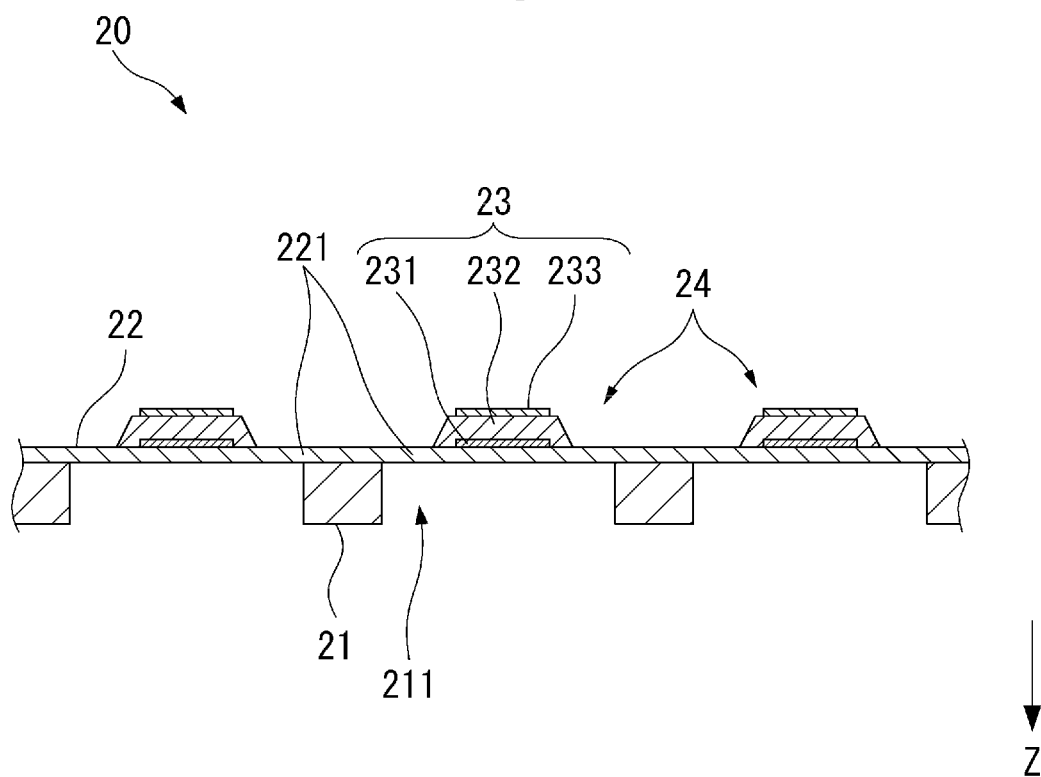
FIG. 2 is a cross-sectional view showing a configuration example of an ultrasonic wave device according to the first embodiment.

FIG. 2 is a cross-sectional view showing a configuration example of the ultrasonic wave device 20.

The ultrasonic wave device 20 is an ultrasonic wave transmission and reception unit which performs the ultrasonic wave transmission and reception processing of transmitting the ultrasonic waves to the object 1, and receiving the ultrasonic waves reflected by the object 1, and outputs reception signals based on reception of the ultrasonic waves. As shown in FIG. 2, the ultrasonic wave device 20 includes an element substrate 21, a vibrating plate 22, and piezoelectric elements 23. In the following description, an ultrasonic wave transmission and reception direction from the ultrasonic wave device 20 to the object 1 is defined as a Z direction.

The element substrate 21 is a substrate that supports the vibrating plate 22 and is formed of a semiconductor substrate such as Si. The element substrate 21 is provided with a plurality of openings 211 penetrating the element substrate 21 along the Z direction.

The vibrating plate 22 is made of, for example, a laminate of $SiO_2$ and $ZrO_2$, and is provided on a $-Z$ side of the element substrate 21. The vibrating plate 22 is supported by the element substrate 21 constituting the openings 211 and closes the $-Z$ side of the openings 211. Portions of the vibrating plate 22 that respectively overlap with the openings 211 when viewed from the Z direction respectively constitute vibrating units 221 that transmit and receive ultrasonic waves by vibration in the vibrating plate 22.

The piezoelectric elements 23 are provided on the vibration plate 22 and are provided at positions respectively overlapping with the vibrating units 221 when viewed from the Z direction. As shown in FIG. 2, each of the piezoelectric elements 23 is configured with sequentially laminating a lower electrode 231, a piezoelectric film 232, and an upper electrode 233 on the vibrating plate 22.

In such an ultrasonic wave device 20, ultrasonic wave transducers 24 are respectively configured with the vibrating units 221 and the piezoelectric elements 23 arranged on the vibrating units 221.

In the ultrasonic wave device 20, when a voltage is applied between the lower electrodes 231 and the upper electrodes 233, the piezoelectric films 232 expand and contract, and the vibrating units 221 vibrate at a frequency corresponding to an opening width of the openings 211. Accordingly, ultrasonic waves are transmitted from the vibrating units 221 toward a Z side.

In the ultrasonic wave device 20, when the ultrasonic waves reflected by the object 1 are input to the vibrating units 221, the vibrating units 221 vibrate with an amplitude corresponding to a sound pressure of the input ultrasonic waves, and a potential difference is generated between the lower electrode 231 side and the upper electrode 233 side of the piezoelectric films 232. Accordingly, a reception signal corresponding to the potential difference is output from the piezoelectric elements 23.

Figure 3:
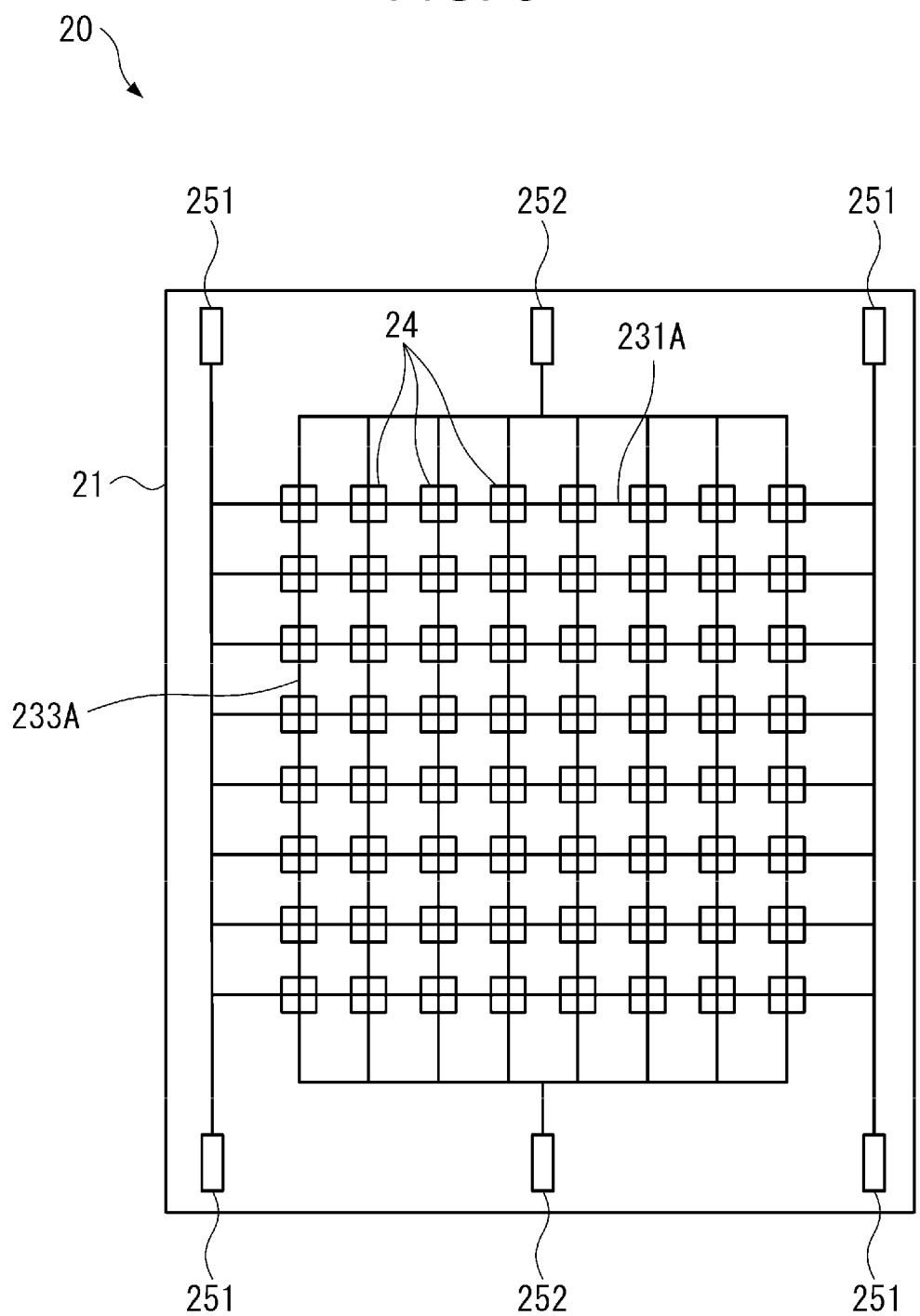
FIG. 3 is a diagram showing a connection example of ultrasonic wave transducers according to the first embodiment.

FIG. 3 is a diagram showing a connection example of the ultrasonic wave transducers 24 in the ultrasonic wave device 20.

In the present embodiment, a plurality of ultrasonic wave transducers 24 are arranged in a matrix of n rows and m columns. The lower electrodes 231 of each ultrasonic wave transducer 24 are connected to one another by first bypass wirings 231A and connected to first terminals 251 provided on parts of the element substrate 21. Similarly, the upper electrodes 233 of each ultrasonic wave transducer 24 are connected to each other by second bypass wirings 233A and are connected to second terminals 252 provided on parts of the element substrate 21. Each of the first terminals 251 and the second terminals 252 are connected to the control circuit 30. In such a configuration, when a voltage is applied between the first terminals 251 and the second terminals 252, all of the ultrasonic wave transducers 24 can be driven simultaneously.

The example shown in FIG. 3 is a configuration example where the lower electrodes 231 of all the ultrasonic wave transducers 24 are connected to one another and connected to the first terminals 251, whereas a configuration where a predetermined number of the ultrasonic wave transducers 24 are defined as one channel and where the first terminals 251 are respectively provided in the channels can also be used. In this case, as shown in FIG. 3, when drive signals are output into all the first terminals 251 and the second terminals 252 simultaneously, all the ultrasonic wave transducers 24 can be driven at the same time. It is also possible to drive the first terminals 251 individually. In this case, a transmission sound pressure can be adjusted by controlling the number of channels to be driven, and an ultrasonic wave transmission direction can be controlled by delay controlling the drive timing of each channel. In addition, the plurality of channels can be divided into transmission channels for transmitting ultrasonic waves and reception channels for receiving ultrasonic waves.

Configuration of Control Circuit 30

Referring back to FIG. 1, the control circuit 30 will be described. As described above, the control circuit 30 is connected to the first terminals 251 and the second terminals 252 of the ultrasonic wave device 20.

As shown in FIG. 1, the control circuit 30 includes a switching circuit 31, a signal ground 32, a transmission circuit unit 33, a reception circuit unit 34, and a microcomputer 35 (microcontroller).

The switching circuit 31 is connected to the first terminals 251 of the ultrasonic wave device 20, the transmission circuit unit 33, and the reception circuit unit 34. The switching circuit 31 switches between a transmission connection that connects the first terminals 251 and the transmission circuit unit 33 and a reception connection that connects the first terminals 251 and the reception circuit unit 34 based on the control of the microcomputer 35.

The signal ground 32 is a ground connected to the second terminals 252 and maintains the second terminals 252 at a predetermined reference potential.

The transmission circuit unit 33 includes, for example, a drive pulse generation circuit 331, and a transmission drive circuit 332.

The drive pulse generation circuit 331 is controlled by the microcomputer 35, and generates a predetermined number of transmission pulses having a predetermined frequency and outputs the transmission pulses to the transmission drive circuit 332 when ultrasonic wave transmission and reception processing is started by the ultrasonic wave device 20. The frequency of the transmission pulses is the same as a transmission frequency of the ultrasonic wave, and is a resonance frequency of the ultrasonic wave transducers 24. A number of the transmission pulses is not particularly limited and may be a preset number, for example, 5 waves.

The transmission drive circuit 332 outputs a drive signal under a predetermined voltage to the first terminal 251 when input the transmission pulses. Accordingly, each ultrasonic wave transducer 24 is driven, and ultrasonic waves are output from the ultrasonic wave device 20 to the object 1.

The reception circuit unit 34 includes, for example, a reception amplifier 341, and a comparator 342.

The reception amplifier 341 amplifies the reception signals output when the ultrasonic wave device 20 receives the ultrasonic waves by a predetermined gain.

The comparator 342 detects reception signals whose signal voltages are equal to or higher than a predetermined threshold from the reception signals amplified by the reception amplifier 341, and detects zero-crossings of the reception signals. That is, the comparator 342 functions as a zero-crossing detection unit. Then, the comparator 342 outputs zero-crossing detection pulses to the microcomputer 35 when the zero-crossings are detected.

The microcomputer 35 includes a memory 351 in which various programs and various data are stored, and a processor 352 that executes instruction sets described in the program stored in the memory 351. In addition, the microcomputer 35 functions as a transmission instruction unit 353, a reception setting unit 354, and a distance measurement unit 355 by executing the programs stored in the memory 351 with the processor 352.

The transmission instruction unit 353 instructs the drive pulse generation circuit 331 to generate the transmission pulses. The generation instruction of the transmission pulses is issued based on a distance measurement request input from an external device connected to the ultrasonic wave measuring device 10. For example, the ultrasonic wave measuring device 10 according to the present embodiment can be incorporated into electronic and industrial equipment, and can instruct generation of the transmission pulses based on a distance measurement request input from a control unit of the electronic and industrial equipment. The ultrasonic wave measuring device 10 may be provided with an input operation unit, and a user may operate the input operation unit to input the distance measurement request.

The reception setting unit 354 calculates a time from the transmission timing of the ultrasonic waves to a zero-crossing detection timing (zero-crossing detection time). Here, in the present embodiment, the reception signal is a signal output by vibration of the vibrating units 221 corresponding to one wave, and a plurality of reception signals are output due to vibration of the vibrating units 221. Accordingly, the reception setting unit 354 calculates respective zero-crossing detection times corresponding to the zero-crossings of the reception signals.

In addition, the reception setting unit 354 sets the zero-crossing of the reception timing of the ultrasonic waves (reception zero-crossing) based on the calculated zero-crossing detection times.

A method for setting the reception zero-crossing will be described later.

The distance measurement unit 355 calculates the distance from the ultrasonic wave device 20 to the object 1 based on the zero-crossing detection time from the transmission timing of the ultrasonic waves to the reception zero-crossing.

Ultrasonic Wave Measuring Method

Then, a distance measurement processing including an ultrasonic wave measuring method performed by the ultrasonic wave measuring device 10 will be described.

As mentioned above, in the ultrasonic wave measuring device 10 according to the present embodiment, a distance between the ultrasonic wave device 20 and the object 1 is calculated on the premise that the ultrasonic wave device 20 and the object 1 are maintained to approximately constant relative positions, and a distance change amount is less than a wavelength of the transmitted ultrasonic waves. For example, when the object 1 is placed at a fixed position, and a minute position change of the object 1 caused by an external stress such as vibration or aging is less than the wavelength of the transmitted ultrasonic wave, the ultrasonic wave measuring method of the present embodiment is effective. Alternatively, when the distance measuring processing is performed periodically, in the case in which an execution cycle for performing the distance measuring processing is sufficiently short, so that when the position change amount of the object 1 with respect to the ultrasonic wave device 20 is less than the wavelength of the transmitted ultrasonic wave in the execution cycle, the ultrasonic wave measuring method according to the present embodiment is effective.

Figure 4:
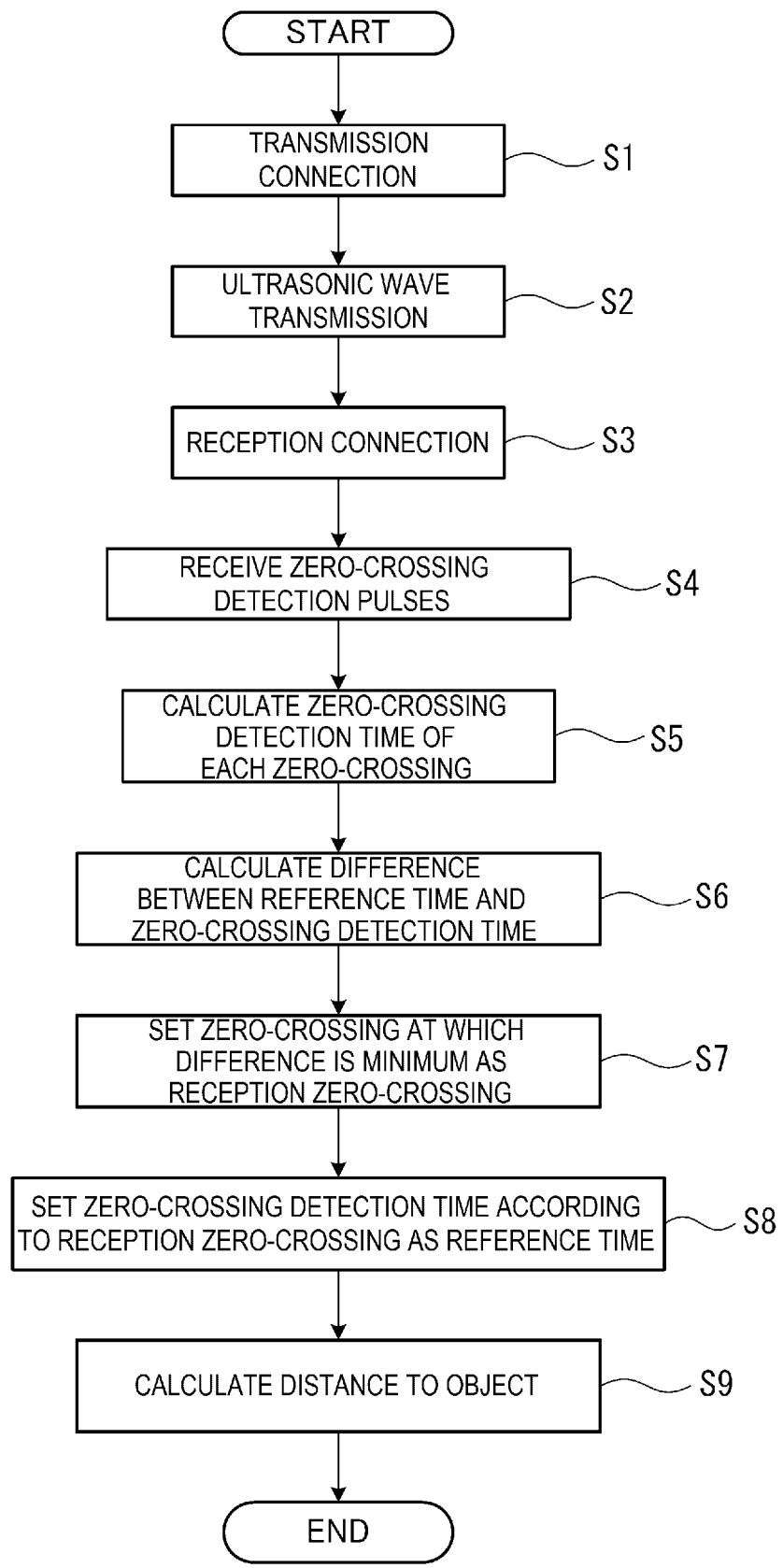
FIG. 4 is a flowchart showing a distance measurement processing according to the first embodiment.
Figure 5:
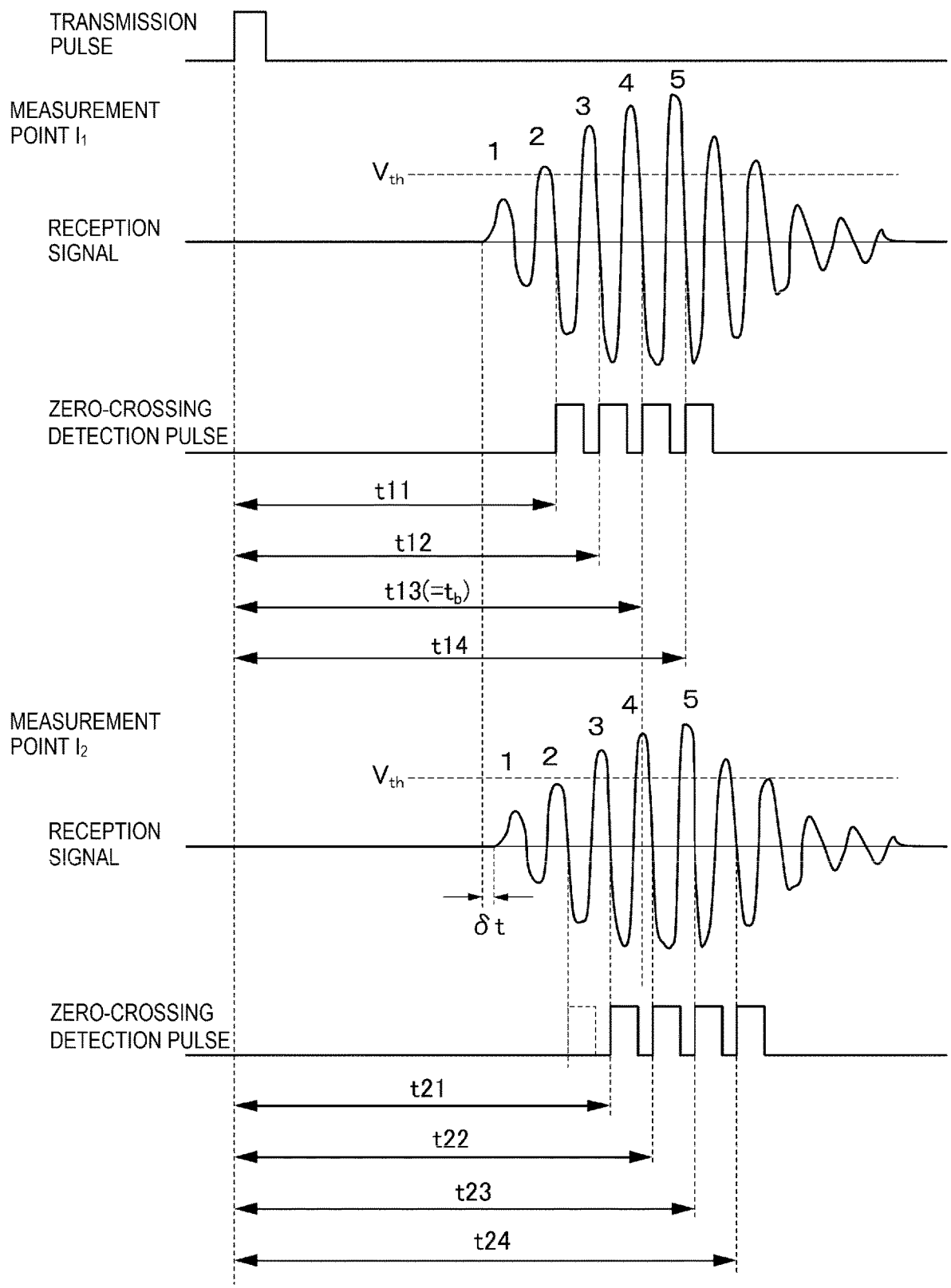
FIG. 5 is a timing chart of transmission pulses, reception signals, and zero-crossing detection pulses in an ultrasonic wave transmission and reception processing according to the first embodiment.

FIG. 4 is a flowchart showing the distance measurement processing of the present embodiment. FIG. 5 is a timing chart of the transmission pulses, the reception signals, and the zero-crossing detection pulses in the ultrasonic wave transmission and reception processing according to this embodiment.

The microcomputer 35 switches to the transmission connection of the switching circuit 31 when the distance measurement request is input from, for example, the external device or the input operation unit (step S1). Then, the transmission instruction unit 353 outputs the generation instruction of the transmission pulses to the drive pulse generation circuit 331, and transmits the ultrasonic waves from the ultrasonic wave device 20 to the object 1 (step S2). That is, the drive pulse generation circuit 331 generates the transmission pulses based on the generation instruction and outputs the transmission pulses to the transmission drive circuit 332, and the transmission drive circuit 332 applies a voltage to each ultrasonic wave transducer 24 based on the transmission pulses. In the present embodiment, the timing when the transmission pulse is transmitted from the drive pulse generation circuit 331 is deemed the transmission timing.

In the present embodiment, an example is shown in which the number of the transmission pulses generated by the drive pulse generation circuit 331 in each time of ultrasonic wave transmission and reception processing is five.

Next, the microcomputer 35 switches the switching circuit 31 to the reception connection (step S3), and receives the zero-crossing detection pulses input from the ultrasonic wave device 20 via the reception circuit unit 34 (step S4).

Specifically, when the switching circuit 31 is switched to the reception connection in step S3, the reception signals output from the ultrasonic wave device 20 are input to the reception circuit unit 34 when the ultrasonic wave device 20 receives the ultrasonic waves. The reception signals are amplified by the reception amplifier 341 and then input to the comparator 342. The comparator 342 detects the zero-crossings of the reception signals whose signal voltages are equal to or higher than a threshold $V_{th}$ among the plurality of input reception signals, and outputs the zero-crossing detection pulses to the microcomputer 35 at the zero-crossing detection timing. The example of FIG. 5 shows a circuit generating up to four zero-crossing detection pulses.

Here, a signal waveform of the reception signals in the ultrasonic wave transmission and reception processing in this embodiment will be described. In the present embodiment, five waves of transmission pulses having a frequency the same as the ultrasonic wave transmission frequency are input from the drive pulse generation circuit 331 to the transmission drive circuit 332. Accordingly, the transmission drive circuit 332 inputs five waves of a periodic drive voltage of the transmission frequency to the ultrasonic wave device 20. For this reason, the vibrating units 221 vibrate upon being driven by the piezoelectric elements 23 by five waves, and then perform damped vibration depending on an elasticity of the vibrating units 221. The vibration frequency during the damped vibration is the resonance frequency of the ultrasonic wave transducers 24. In the present embodiment, the frequency of the transmission pulses is the same as the resonance frequency of the ultrasonic wave transducers 24.

In this case, the sound pressure of the predetermined waves of the ultrasonic waves output when the vibrating units 221 are vibrated upon being driven by the piezoelectric elements 23 is high, and then, the ultrasonic waves are transmitted by a reverberant component, whereas the sound pressure becomes smaller than the sound pressure when the piezoelectric elements 23 are driving, and gradually decreases with time.

On the other hand, when the ultrasonic waves are received by the ultrasonic wave transducers 24, the vibrating units 221 are displaced based on reception of the reflected ultrasonic waves, and then resonate depending on the elasticity of the vibrating units 221, thereby obtaining a reverberation component. The reverberation component is a damped vibration based on the resonance frequency of the ultrasonic wave transducers 24, and has an amplitude that gradually decreases with time. Here, in the present embodiment, when the five transmission pulses whose frequencies are the same as the resonance frequency of the ultrasonic wave transducers 24 are generated, the five reflected ultrasonic waves are received at a frequency the same as the resonance frequency. Accordingly, a second wave of the reflected ultrasonic waves overlaps with the reverberation component of the first wave of the reflected ultrasonic waves, so that the vibration amplitude increases. Similarly, a third wave of the reflected ultrasonic waves overlaps with the reverberation component of the first wave and the second wave of the reflected ultrasonic waves. Accordingly, as shown in FIG. 5, the signal voltage of the reception signals gradually increases until the five reflected ultrasonic waves are received. In addition, after receiving a fifth wave of the reflected ultrasonic waves, vibration of the vibration units 221 is only the reverberation component, and the amplitude thereof gradually decreases.

Incidentally, a reception waveform at a measurement point $I_2$ in FIG. 5 is a reception waveform when the relative position of the object 1 with respect to the ultrasonic wave device 20 is farther than a measurement point $I_1$. When the distance from the ultrasonic wave device 20 to the object 1 increases, as shown in FIG. 5, the time until the reflected ultrasonic waves are received by the ultrasonic wave device 20 also increases by a time δt corresponding to the distance. In addition, when the distance from the ultrasonic wave device 20 to the object 1 increases, the sound pressure of the ultrasonic wave received by the ultrasonic wave transducers 24 decreases.

For this reason, when ones of the reception signals whose signal voltages are equal to or higher than the threshold value $V_{th}$ are detected by the comparator 342, the detection number of the reception signals may change. For example, in the example shown in FIG. 5, six reception signals whose signal voltages are equal to or higher than the threshold value $V_{th}$ are detected at the measurement point $I_1$, and four reception signals whose signal voltages are equal to or higher than the threshold value $V_{th}$ are detected at the measurement point $I_2$.

In such a case, for example, when a first detected zero-crossings of the reception signals whose signal voltages are equal to or higher than the threshold value $V_th$ is set as the reception zero-crossing when the ultrasonic waves are received, an offset error occurs depending on the time of measurement. For example, in the example of FIG. 5, at the measurement point $I_1$, a second zero-crossing is set as the reception zero-crossing, and at the measurement point $I_2$, a third zero-crossing is set as the reception zero-crossing, so that the measurement point $I_1$ and the measurement point $I_2$ have an offset error for one cycle.

In addition, although it is conceivable to set the zero-crossing of a maximum reception signal as the reception zero-crossing, a fifth reception signal may be not the maximum, and a fourth reception signal or a sixth reception signal may be the maximum depending on a measurement environment and measurement conditions. Accordingly, even in this case, it is difficult to prevent occurrence of the offset error.

Here, in the present embodiment, the reception setting unit 354 sets the reception zero-crossing according to the following procedure.

That is, when receiving the zero-crossing detection pulses in step S4, the reception setting unit 354 of the microcomputer 35 calculates the zero-crossing detection time from the transmission timing of the ultrasonic waves to each of the zero-crossings (step S5).

Then, the reception setting unit 354 calculates a difference between a reference time $t_b$ stored in the memory 351 and the zero-crossing detection time corresponding to each of the zero-crossings calculated in step S5 (step S6).

Then, the reception setting unit 354 sets a zero-crossing at which the difference between the reference time $t_b$ and the zero-crossing detection time calculated in step S6 is minimum among the plurality of zero-crossings as the reception zero-crossing (step S7).

In addition, the reception setting unit 354 stores the zero-crossing detection time from the transmission timing to the reception zero-crossing as a new reference time $t_b$ in the memory 351 (step S8).

In this case, the reference time $t_b$ is not set in the ultrasonic wave transmission and reception processing performed for the first time. Accordingly, when setting the reception zero-crossing in the first ultrasonic wave transmission and reception processing, the reception setting unit 354 may set the reception zero-crossing using the predetermined reference time $t_b$ set in advance.

When setting the reference time $t_b$ for the ultrasonic wave transmission and reception processing performed for the first time, for example, when the ultrasonic wave measuring device 10 is produced, the distance from the object 1 to the ultrasonic wave device 20 is set to a predetermined reference distance, so as to perform the ultrasonic wave transmission and reception processing. In addition, the zero-crossing detection time with respect to the zero-crossing of a specific reception signal is measured in advance, and the zero-crossing detection time is recorded as the reference time $t_b$ in advance. For example, in the example of FIG. 5, when the distance from the object 1 to the ultrasonic wave device 20 is set to a predetermined reference distance, a zero-crossing detection time t13 for the fourth wave of the reception signals is set as the reference time $t_b$. In this case, when the difference between the distance from the object 1 to the ultrasonic wave device 20 and the reference distance is less than the wavelength of the transmitted ultrasonic wave, a zero-crossing detection time at which the difference between the reference time $t_b$ and the zero-crossing detection time is minimum is the zero-crossing detection time of the fourth wave of the reception signals. Accordingly, at the measurement point Ii, the zero-crossing of the fourth wave of the reception signals is set as the reception zero-crossing.

In addition, in the measurement for the measurement point $I_2$, the zero-crossing detection time t13 corresponding to the reception zero-crossing at the measurement point $I_1$ is the reference time $t_b$. Accordingly, the zero-crossing of the fourth wave of the reception signals, which corresponds to a zero-crossing detection time t22 at which the difference between the zero-crossing detection time and the reference time $t_b$ is minimum, is set as the reception zero-crossing at the measurement point $I_2$.

That is, in this embodiment, the reception setting unit 354 uses a zero-crossing detection time from a transmission timing of an ultrasonic wave transmission and reception processing performed at an i-th time (i is an integer of one or more) to a reception zero-crossing set based on the ultrasonic wave transmission and reception processing performed at the i-th time as a reference time $t_b$ when the reception zero-crossing is set based on an ultrasonic wave transmission and reception processing performed at an i+1-th time.

After the above, the distance measurement unit 355 calculates the distance from the ultrasonic wave device 20 to the object 1 based on the zero-crossing detection time from the transmission timing to the reception zero-crossing and a sound speed (step S9).

Effects of Embodiment

The ultrasonic wave measuring device 10 according to the embodiment includes the ultrasonic wave device 20 and the control circuit 30. The ultrasonic wave device 20 transmits the ultrasonic waves to the object 1, performs the ultrasonic wave transmission and reception processing of receiving the reflected ultrasonic waves reflected by the object 1, and outputs the reception signals based on reception of the ultrasonic waves. In addition, the control circuit 30 includes the reception circuit unit 34 and the microcomputer 35. The reception circuit unit 34 includes the comparator 342, and the comparator 342 functions as a zero-crossing detection unit that detects a zero-crossing of the reception signal whose signal voltage is equal to or higher than the predetermined threshold $V_{th}$. In addition, the microcomputer 35 functions as the reception setting unit 354, and sets a reception zero-crossing used as the reception timing of the ultrasonic waves among the plurality of zero-crossings detected via the ultrasonic wave transmission and reception processing. At this time, in the present embodiment, the reception setting unit 354 calculates the zero-crossing detection time from the transmission timing of the ultrasonic waves to the plurality of zero-crossings with respect to the ultrasonic wave transmission and reception processing for each time of measurement. Then, the difference between the reference time stored in the memory 351 and each zero-crossing detection time is calculated, and the zero-crossing at which the difference between the reference time and the zero-crossing detection time is minimum is set as the reception zero-crossing.

In the present embodiment, when a change amount in the distance between the ultrasonic wave device 20 and the object 1 is less than the wavelength of the transmitted ultrasonic wave, the time when the reception signal is obtained does not change greatly. Thus, in this way, the zero-crossing at which the difference between the reference time and the zero-crossing detection time is minimum is set as the reception zero-crossing, so that even when the detection number of the reception signals whose signal voltages are equal to or higher than the threshold value $V_{th}$ changes, an appropriate reception zero-crossing can be set and the offset error can be prevented.

In addition, in this embodiment, there is no need to perform a plurality of times of ultrasonic wave transmission and reception processing on each measurement point, so that the memory capacity of the memory 351 for temporarily storing the reception signals can be reduced, and a high-performance A/D converter for analyzing the reception signals with high resolution is unnecessary. Accordingly, the configuration of the ultrasonic wave measuring device 10 can be simplified, so that the cost can be reduced and the processing time related to the distance measuring processing can also be shortened.

In this embodiment, the reception setting unit 354 sets the reception zero-crossing in the ultrasonic wave reception processing performed at the i+1-th time with the zero-crossing detection time corresponding to the reception zero-crossing set in the ultrasonic wave transmission and reception processing performed at the i-th time as the reference time $t_b$.

When a constant value is used as the reference time $t_b$, there is a case that the appropriate reception zeroing-crossing cannot be set when the distance between the object 1 and the ultrasonic wave device 20 gradually varies from the reference distance. For example, when the change amount between the distance from the object 1 to the ultrasonic wave device 20 and the reference distance is less than the wavelength of the transmitted ultrasonic wave, the reception zero-crossing can be set using the reference time $t_b$ which is a constant value. However, for example, due to changes over time, the distance between the object 1 and the ultrasonic wave device 20 is increasing gradually, and when the change amount between the distance from the object to the ultrasonic wave device 20 and the reference distance is equal to or greater than the wavelength of the transmitted ultrasonic wave, the appropriate reception zero-crossing cannot be set.

Accordingly, in this way, when the reference time $t_b$ based on the latest ultrasonic wave measurement processing is updated, even when the distance between the ultrasonic wave device 20 and the object 1 changes gradually, the appropriate reception zero-crossing can be set.

Second Embodiment

Next, a second embodiment will be described.

In the first embodiment, it is assumed that a change amount in the distance from the object 1 to the ultrasonic wave device 20 is less than the wavelength of the transmitted ultrasonic wave, so that when the change amount in the distance from the object 1 to the ultrasonic wave device 20 is equal to or greater than the wavelength of the transmitted ultrasonic wave, the reception zero-crossing cannot be set appropriately. Here, in the second embodiment, an ultrasonic wave measuring device capable of setting an appropriate reception zero-crossing even when the change amount in the distance from the object 1 to the ultrasonic wave device 20 is equal to or greater than the wavelength of the transmitted ultrasonic wave will be described.

In the following description, items that have been described are denoted by the same reference numerals, and the description thereof is omitted or simplified.

The ultrasonic wave measuring device 10 of the second embodiment has a configuration the same as the configuration of the first embodiment, and includes the ultrasonic wave device 20 and the control circuit 30 as shown in FIG. 1. In addition, in the second embodiment, the processing of the reception setting unit 354 which is a function structure of the microcomputer 35 differs from the first embodiment. Accordingly, in the following description, the ultrasonic wave measuring method by the ultrasonic wave measuring device 10 will be described in detail.

Figure 6:
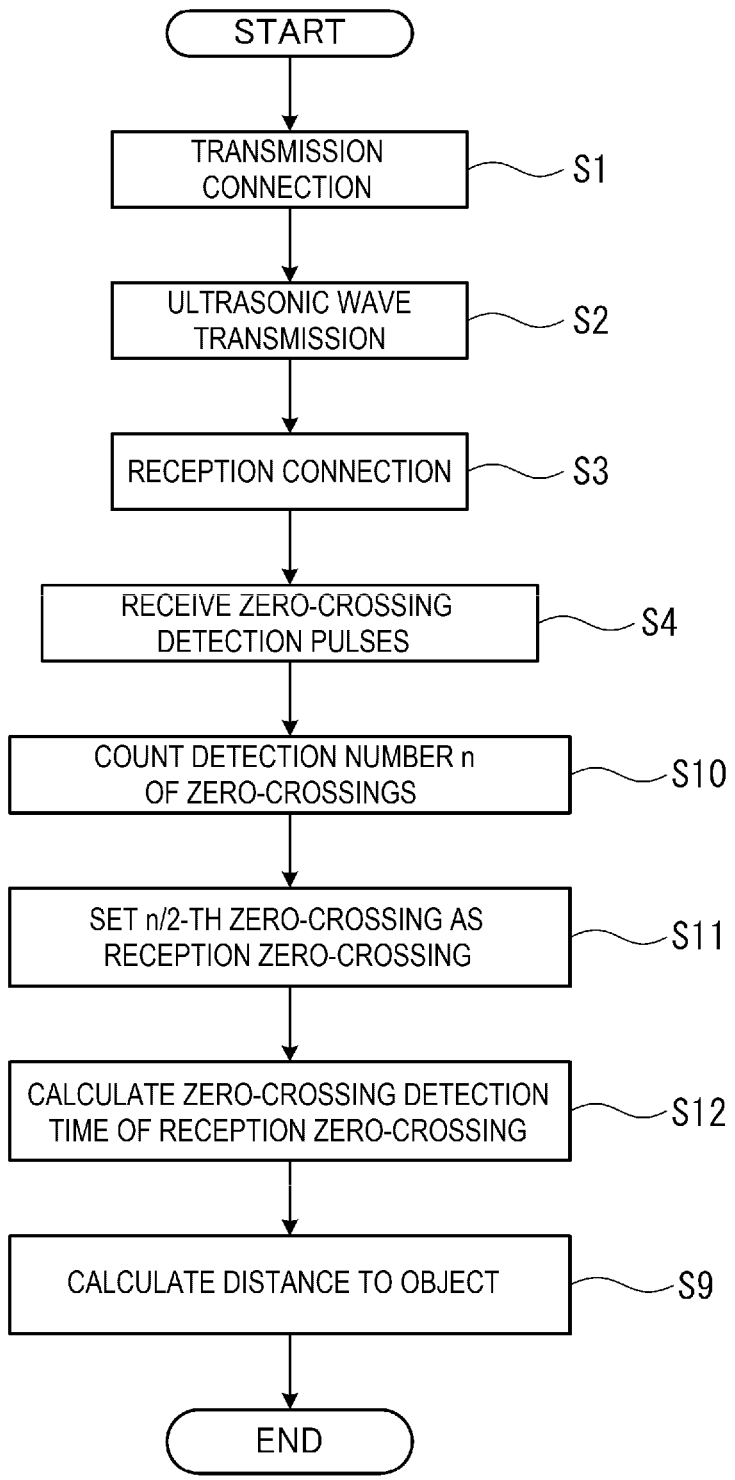
FIG. 6 is a flowchart showing a distance measurement processing of an ultrasonic wave measuring device according to a second embodiment.
Figure 7:
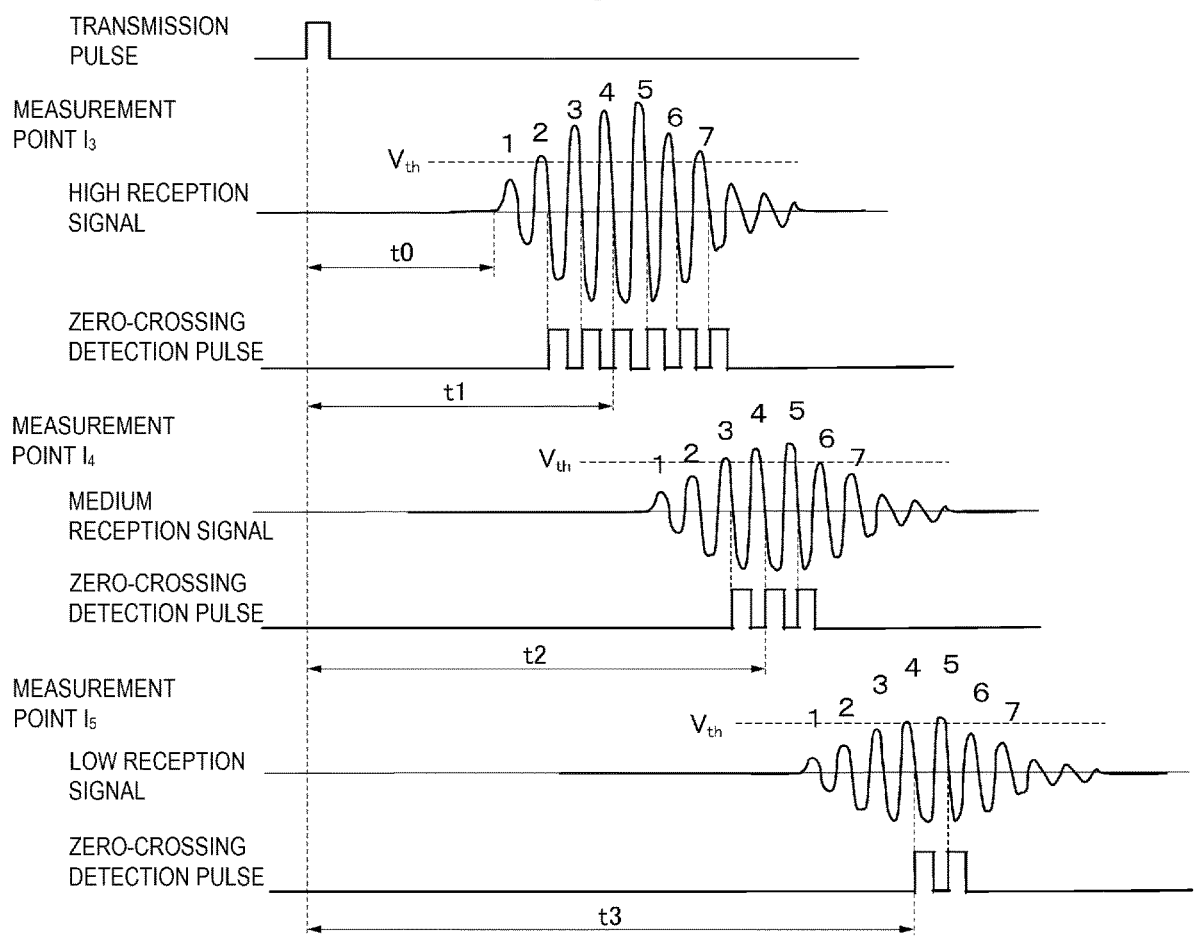
FIG. 7 is a timing chart of transmission pulses, reception signals, and zero-crossing detection pulses in an ultrasonic wave transmission and reception processing according to the second embodiment.

FIG. 6 is a flowchart showing a distance measurement processing of the ultrasonic wave measuring device 10 according to the second embodiment. FIG. 7 is a timing chart of transmission pulses, reception signals, and zero-crossing detection pulses during the ultrasonic wave transmission and reception processing of the ultrasonic wave measuring device 10 of the second embodiment.

As shown in FIG. 6, the ultrasonic wave measuring device 10 of the second embodiment performs the ultrasonic wave transmission and reception processing from step S1 to step S4 when measuring the distance from the object 1 to the ultrasonic wave device 20 as in the first embodiment.

Then, in the present embodiment, the reception setting unit 354 counts the detection number n of the zero-crossings of the reception signals whose signal voltages are equal to or greater than the threshold value $V_{th}$ (step S10). That is, the reception setting unit 354 counts the number n of the zero-crossing detection pulses input from the comparator 342.

Then, the reception setting unit 354 sets a zero-crossing that is n/2-th detected from the start among the detected zero-crossings as the reception zero-crossing (step S11). If n/2 is not an integer, the value is rounded up to a nearest integer. That is, when the detection number n is an even number, the reception setting unit 354 sets a zero-crossing of a previous one of reception signals of two central reception signals as the reception zero-crossing. When the detection number n is an odd number, the reception setting unit 354 sets a zero-crossing of a central reception signal as the reception zero-crossing.

In the ultrasonic wave reception processing, when a predetermined wave number K of ultrasonic waves are transmitted, the signal voltage of the reception signals gradually increases from the first wave. Then, after the K-th reflected ultrasonic wave is received, a reception signal according to the reverberation vibration of the vibration units 221 is obtained, and thus the signal voltage gradually decreases. Accordingly, as shown in FIG. 7, when a plurality of reception signals whose signal voltages are equal to or higher than the threshold value $V_{th}$ are observed in time series, the signal voltage of a previous half of the reception signals and the signal voltage of a subsequent half of the reception signals are substantially symmetric with respect to the center. As shown in FIG. 7, this tendency can be observed regardless of the distance from the object 1 to the ultrasonic wave device 20. Accordingly, the zero-crossing of the central reception signal among the plurality of detected reception signals is set as the reception zero-crossing, so that an appropriate reception zero-crossing can be set for each time of measurement.

For example, in FIG. 7, at a measurement point 13, zero-crossings with respect to six reception signals from the second wave to the seventh wave are detected. In this case, since n=6, a zero-crossing of the third (=6/2) reception signal from the start of the six waves, that is, the fourth wave of the reception signals is set as the reception zero-crossing.

At a measurement point 14, zero-crossings with respect to three reception signals from the third wave to the fifth wave are detected. In this case, since n=3, a zero-crossing of the second reception signal from the start of the three waves, that is, the fourth wave of the reception signals is set as the reception zero-crossing.

At a measurement point $I_s$, zero-crossings for two reception signals from the fourth wave to the fifth wave are detected. In this case, since n=2, a zero-crossing of the first reception signal of the two waves, that is, the fourth wave of the reception signals is set as the reception zero-crossing.

As described above, at any measurement point, the zero-crossing of the fourth wave of the reception signals is set as the reception zero-crossing, and the occurrence of an offset error is prevented.

After the above step S11, the reception setting unit 354 calculates a zero-crossing detection time from the transmission timing of the ultrasonic waves to the set reception zero-crossing (step S12).

Then, the distance measurement unit 355 calculates the distance from the object 1 to the ultrasonic wave device 20 using the zero-crossing detection time corresponding to the calculated reception zero-crossing, as in step S9 of the first embodiment.

Effects of Embodiment

Similar to the first embodiment, the ultrasonic wave measuring device 10 of this embodiment includes the ultrasonic wave device 20 and the control circuit 30 including the microcomputer 35. In addition, in this embodiment, the microcomputer 35 functions as the reception setting unit 354, the reception setting unit 354 sets the detection number of the zero-crossings as n, and sets the zero-crossing corresponding to the zero-crossing detection pulse that is n/2-th detected as the reception zero-crossing.

As described above, when a plurality of reception signals are viewed in time series, the signal voltage of the previous half of the reception signals and the signal voltage of the subsequent half of the reception signals are substantially symmetrical with respect to the center. Accordingly, the zero-crossing of this central reception signal is set as the reception zero-crossing, so that even when the detection number of the reception signals whose signal voltages are equal to or higher than the threshold value $V_{th}$ changes, the appropriate reception zero-crossing can be set and an offset error can be prevented.

In addition, similarly to the first embodiment, in this embodiment, there is no need to perform a plurality of times of ultrasonic wave transmission and reception processing for each measurement point, so that the memory capacity of the memory 351 for temporarily storing the reception signals can be reduced, and a high-performance A/D converter that analyzes the reception signals with high resolution is unnecessary. Accordingly, the configuration of the ultrasonic wave measuring device 10 can be simplified, and the processing time related to the distance measuring processing can be shortened.

In addition, in this embodiment, even if the distance between the object 1 and the ultrasonic wave device is longer than the wavelength of the transmitted ultrasonic wave, it is possible to set an appropriate zero-crossing, so that the application field of the ultrasonic wave measuring device 10 can be expanded.

Modification

The present disclosure is not limited to the embodiments described above, and includes configurations obtained by modifying, improving, and appropriately combining the embodiments as long as the object of the present disclosure can be achieved.

Although the ultrasonic wave measuring device 10 has been described as the first embodiment and the second embodiment, the ultrasonic wave measuring device 10 may be used as a single measuring sensor that measures the distance to the object 1, or may be used by being incorporated in various electronic devices, industrial devices, and the like.

For example, the ultrasonic wave measuring device 10 according to the first embodiment can be applied to a device in which the distance between the object 1 and the ultrasonic wave device 20 is kept constant. Examples of such a device include a printing device such as an inkjet printer. When the ultrasonic wave measuring device 10 of the first embodiment is used to an inkjet printer, the ultrasonic wave measuring device 10 may be mounted on a carriage on which an ink head that discharges ink to a print medium is mounted. Generally, when the inkjet printer print on the print medium, in order to prevent a decrease in printing accuracy, it is necessary to keep the distance between the carriage and the print medium within a certain distance range. Accordingly, in this way, the ultrasonic wave measuring device 10 that measures the distance to the print medium is mounted on the carriage, so that it can be checked whether the carriage is maintained within a certain distance range with respect to the print medium.

In addition, in the ultrasonic wave measuring device 10 of the second embodiment, the distance between the object 1 and the ultrasonic wave device 20 may change greatly, and the ultrasonic wave measuring device 10 can be incorporated into more devices. For example, the ultrasonic wave measuring device 10 of the second embodiment may be provided in an ink tank of the inkjet printer, and the position of the liquid level in the ink tank may be measured. In industrial equipment such as a robot arm, the ultrasonic wave measuring device 10 of the second embodiment may be incorporated in the arm that grips an object, and the distance from the arm to the object may be measured.

In the first embodiment, the reception setting unit 354 stores the reference time $t_b$ in the memory 351, and updates the reference time $t_b$ each time the ultrasonic wave transmission and reception processing is performed and the reception zero-crossing is set. With respect to this, a constant value may be used as the reference time $t_b$. In this case, the zero-crossing detection time for a predetermined zero-crossing when the distance between the ultrasonic wave device 20 and the object 1 is the reference distance is defined as the reference time $t_b$. Accordingly, it is possible to calculate the displacement amount between the distance from the ultrasonic wave device 20 to the object 1 and the reference distance.

What is claimed is:

1. An ultrasonic wave measuring device, comprising:
an ultrasonic wave device configured to transmit transmission ultrasonic waves toward an object, the transmission ultrasonic waves being reflected by the object to become reflected ultrasonic waves, the ultrasonic wave device being configured to receive the reflected ultrasonic waves and output reception signals;

a memory configured to store a program and an initial reference period of time; and a processor configured to execute the program so as to:
  detect a first transmission time at which the transmission ultrasonic waves are transmitted toward the object that is placed at a reference position, the ultrasonic wave device being spaced apart from the reference position by a reference distance;
  set a reception period of time between the first transmission time and a reception time of a specific zero-crossing point of the reception signals as the initial reference period of time;
  detect a second transmission time at which the transmission ultrasonic waves are transmitted toward the object that is placed at a first position different from the reference position;
  compare each signal value of the reception signals with a threshold so as to generate first selected signals when the object is placed at the first position, each signal value of the first selected signals being equal to or more than the threshold;
  detect first zero-crossing points of the first selected signals;
  detect first zero-crossing times at which the first zero-crossing points are detected;
  calculate first periods of time between the second transmission time and each of the first zero-crossing times;
  compare the initial reference period of time with each of the calculated first periods of time so as to generate first difference values therebetween;
  determine a first minimum value among the first difference values;
  set a corresponding first zero-crossing point having the first minimum value as a first reception zero-crossing point;
  measure a first distance toward the object at the first position based on the first period of time between the first zero-crossing time corresponding to the first reception zero-crossing point and the second transmission time;
  set the first period of time between the first zero-crossing time corresponding to the first reception zero-crossing point and the second transmission time as a new reference period of time;
  detect a third transmission time at which the transmission ultrasonic waves are transmitted toward the object that is placed at a second position different from the reference position and the first position;
  compare each signal value of the reception signals with the threshold so as to generate second selected signals when the object is placed at the second position, each signal value of the second selected signals being equal to or more than the threshold;
  detect second zero-crossing points of the second selected signals;
  detect second zero-crossing times at which the second zero-crossing points are detected;
  calculate second periods of time between the third transmission time and each of the second zero-crossing times;
  compare the new reference period of time with each of the calculated second periods of time so as to generate second difference values therebetween;
  determine a second minimum value among the second difference values;
  set a corresponding second zero-crossing point having the second minimum value as a second reception zero-crossing point; and
  measure a second distance toward the object at the second position based on the second period of time between the second zero-crossing time corresponding to the second reception zero-crossing point and the third transmission time.

2. An ultrasonic wave measuring method for causing a processor to execute a process, the method comprising executing on the processor the steps of:
  transmitting transmission ultrasonic waves toward an object, the transmission ultrasonic waves being reflected by the object to become reflected ultrasonic waves;
  receiving the reflected ultrasonic waves so as to output reception signals;
  detecting a first transmission time at which the transmission ultrasonic waves are transmitted toward the object that is placed at a reference position, the ultrasonic wave device being spaced apart from the reference position by a reference distance;
  setting a reception period of time between the first transmission time and a reception time of a specific zero-crossing point of the reception signals as an initial reference period of time;
  detecting a second transmission time at which the transmission ultrasonic waves are transmitted toward the object that is placed at a first position different from the reference position;
  comparing each signal value of the reception signals with a threshold so as to generate first selected signals when the object is placed at the first position, each signal of the first selected signals being equal to or more than the threshold;
  detecting first zero-crossing points of the first selected signals;
  detecting first zero-crossing times at which the first zero-crossing points are detected;
  calculating first periods of time between the second transmission time and each of the first zero-crossing times;
  comparing the initial reference period of time with each of the calculated first periods of time so as to generate first difference values therebetween;
  determining a first minimum value among the first difference values;
  setting a corresponding first zero-crossing point having the first minimum value as a first reception zero-crossing point;
  measuring a first distance toward the object based on the first period of time between the first zero-crossing time corresponding to the first reception zero-crossing point and the second transmission time;
  setting the first period of time between the first zero-crossing time corresponding to the first reception zero-crossing point and the second transmission time as a new reference period of time;
  detecting a third transmission time at which the transmission ultrasonic waves are transmitted toward the object that is placed at a second position different from the reference position and the first position;
  comparing each signal value of the reception signals with the threshold so as to generate second selected signals when the object is placed at the second position, each signal value of the second selected signals being equal to or more than the threshold;

detecting second zero-crossing points of the second selected signals;

detecting second zero-crossing times at which the second zero-crossing points are detected;

calculating second periods of time between the third transmission time and each of the second zero-crossing times;

comparing the new reference period of time with each of the calculated second periods of time so as to generate second difference values therebetween;

determining a second minimum value among the second difference values;

setting a corresponding second zero-crossing point having the second minimum value as a second reception zero-crossing point; and measuring a second distance toward the object at the second position based on the second period of time between the second zero-crossing time corresponding to the second reception zero-crossing point and the third transmission time.

* * * * *